United States Patent Office 3,442,929
Patented May 6, 1969

3,442,929
N-CYANOALKYL HALOACETAMIDES
Teruhisa Noguchi, Fujisawa-shi, Keisuke Komoto, Hiratsuka-shi, Yoshio Uchiyama, Takaoka-shi, and Saburo Kano, Toyama-shi, Japan, assignors to Nippon Soda Kabushiki Kaisha, Tokyo-to, Japan, a company of Japan
No Drawing. Filed July 19, 1966, Ser. No. 566,236
Claims priority, application Japan, July 21, 1965, 40/43,785
Int. Cl. C07c *121/16*
U.S. Cl. 260—465.4    3 Claims

ABSTRACT OF THE DISCLOSURE

Compounds of the formula

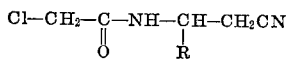

in which R is a hydrogen atom or an alkyl radical having 1 to 3 carbon atoms are useful as fungicides for application to plants or soil.

---

The present invention relates to novel compounds of N-cyanoalkyl haloacetamides and a novel fungicidal use and compositions of the same and homologous compounds thereof, and methods for the combat and eradication of fungi damaging plants.

It has been discovered that certain N-cyanoalkyl haloacetamide of the formula described hereunder and those including novel compounds have superior activity as fungicides and especially as anti-powdery mildew agents.

The compounds of the fungicidal active ingredients of the invention have the following Formula I:

$$X-CH_2-\underset{\underset{O}{\|}}{C}-NH-Y-CN \qquad (I)$$

wherein X is chlorine or bromine atom, and Y is a branched or not branched alkylene having 1 to 5 carbon atoms.

The active compounds of the invention exemplified in the following Table I:

TABLE I

| Compound No.: | Active ingredient |
|---|---|
| I | N - cyanomethyl monochloroacetamide. |
| II | N - cyanoethyl monochloroacetamide. |
| III | N - cyanomethyl monobromoacetamide. |
| IV | N - cyanoethyl monobromacetamide. |
| V | N - (1 - cyano 1-methyl)ethyl monochloroacetamide. |
| VI | N - (1 - methyl 2-cyano)ethyl monochloroacetamide. |

A part of the compounds including the above general formula are known, but fungicidal, insecticidal and herbicidal activities and any agricultural use thereof are not known at all.

The process for the preparation of the compounds I and V of Table I, which are known compounds, are cited in Ber. 65 B 1,183 (1932) and Hoppe-Seyer's Zeitschrift für Physiologishe Chemie 154 163 (1926).

On the other hand, the compounds of the following Formula II, which is more narrowly defined than Formula I, are novel compounds:

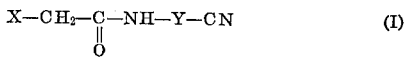

wherein X is chlorine or bromine atom, and R is hydrogen atom or an alkyl radical having 1 to 3 carbon atoms.

In general, the novel compounds prepared by a reaction of chloro- or bromo-acetylhalides prepared by a reaction of haloacetylhalides and corresponding cyanoalkylamines, and the embodiments of the processes are illustrated in the following examples:

Example 1.—N-cyanoethyl monochloroacetamide

To a solution of 43 g. of 2-cyanoethylamine in 250 ml. of dichloropropane, 80 g. of monochloroacetylchloride was gradually added under stirring, and the temperature was maintained at 15–25° C. After completion of the addition, the mixture was heated under reflux for 1.5 hours. The solvent was removed from the cooled reaction mixture to give 87 g. of a crystalline residue which was washed with a small quantity of water, dried and recrystallized from dichloropropane. 81 g. of pure N-cyanomethyl monochloroacetamide, colorless plates of M.P. 95–96.5° C., was obtained in a yield of 90%.

*Analysis.*—Calcd. for $C_5H_7ClN_2O$: C, 41.0; H, 4.8; Cl, 24.2; N, 19.1. Found: C, 40.8; H, 4.8; Cl, 24.0; N, 19.0.

Example 2.—N-cyanomethyl monobromoacetamide

To a cold solution of 11 g. of α-cyanomethylamine sulfate in 10 ml. of methanol, sodium methoxide solution prepared from 3.3 g. of sodium and methanol was added to form a solution of free α-cyanomethylamine. The solution was stirred for 1 hour under room temperature and then sodium sulfate was separated therefrom by filtration. The filtrate was evaporated under reduced pressure, and the residue was dissolved in 100 ml. of dichloromethane. To the solution maintained at a temperature of 0–3° C., 16 g. of monobromoacetylchloride was added dropwise in the presence of 6 g. of sodium bicarbonate. After completion of the addition, the mixture was gradually warmed to room temperature and stirred for 1 hour. Solid material separated from the reaction mixture by filtration was crystallized from acetone to obtain 2 g. of colorless crystals having M.P. 100–105° C.

*Analysis.*—Calcd. for $C_4H_5BrN_2O$: C, 27.1; H, 2.8; Br, 45.2; N, 15.8. Found: C, 26.8; H, 2.9; Br, 45.2; N, 15.4.

Example 3.—N-cyanoethyl monobromoacetamide

To a solution of 35 g. of 2-cyanoethylamine in 200 ml. of dichloropropane maintained at a temperature of 20–25° C., 38.5 g. of phosphorus oxychloride and then 70 g. of monobromoacetylchloride were gradually added under stirring at a temperature of 20 to 25° C.

The mixture was heated for 1.5 hours under reflux, and the mixture was decanted. The decanted solution was cooled to precipitate crystals, which was separated and washed with a small quantity of cold water and dried. Recrystallization from dichloropropane gave 52.5 g. of pure N-cyanoethyl monobromoacetamide, colorless plates of M.P. 84–85° C., in a yield of 55%.

*Analysis.*—Calcd. for $C_5H_7BrN_2O$: C, 31.4; H, 3.7; Br, 41.9; N, 14.7. Found: C, 31.2; H, 3.7; Br, 42.0; N, 14.5.

Example 4.—N-(1-methyl 2-cyano)ethyl monochloroacetamide

To a solution of 10 g. of β-aminobutyronitrile in 60 ml. of anhydrous chloroform, 13.5 g. of monochloroacetylchloride was added gradually under agitation at a temperature of 15–20° C. After completion of the addition, the mixture was heated for 3 hours under reflux. The reaction mixture was distilled to remove chloroform off and the residue was poured into cold water. The precipitated crystals was collected, and extracted with chloroform. The combined extracts was dried over anhydrous magnesium sulfate, and then distilled under reduced pressure. 14.5 g. of N-(1-methyl 2-cyano)ethyl monochloroacetamide, B.P. 138–140° C./4 mm. Hg was obtained as colourless liquid in a yield of 76%.

*Analysis.*—Calcd. for $C_6H_9ClN_2O$: C, 44.7; H, 5.6; Cl, 22.4; N, 17.4. Found: C, 44.4; H, 5.6; Cl, 22.2; N, 17.1.

In this invention, usually a small but effective amount of the compounds are applied to plant surfaces by spraying and on or into soil near the roots of plants by drenching to protect or control fungi or fungal diseases.

The concentrations of the active ingredients of the compounds in the fungicidal compositions of this invention are varied by the kind of the formulation, and they are used in a range of 10–70% more preferably 20–60% in wettable powder, 0.5–10% more preferably 1–5% in the dust formulation and 10–70% more preferably 10–50% in the emulsifiable concentrate. The non-limiting examples of the compositions of the invention are illustrated as follows:

Example 5.—Wettable powder

| | Parts by weight |
|---|---|
| Compound II | 30 |
| Sodium alkylsulfonate | 5 |
| Sodium dinaphthylmethane disulfonate | 3 |
| Diatomaceous earth | 62 |

These were mixed and micronized in a jet pulverizer to a particle size of 10–20 micron. In practical use, the micronized mixture was diluted in a concentration of 0.01 to 0.05% of active ingredient with water. The suspension was applied as a spray or drench.

Example 6.—Dust formulation

| | Parts by weight |
|---|---|
| Compound I | 3 |
| Talc | 96.9 |
| Alkylallylpolyoxyethylene | 0.1 |

These were mixed and crushed in fine powders. The formulation was applied as dusting at a rate of 3 to 5 kg. per 10 are.

Example 7.—Emulsifiable concentrate

| | Parts by weight |
|---|---|
| Compound VI | 15 |
| Xylene | 55 |
| Cyclohexanone | 20 |
| Alkylarylpolyoxyethylene | 10 |

These were mixed and dissolved. In practical use, this solution was diluted with water in a concentration of 0.01 to 0.05% of active ingredient and this suspension was sprayed or drenched.

In Examples 5–7, emulsifying, wetting or dispersing agents, carries and solvents are not intended to limit them hereinto described.

The superior fungicidal effects of the compounds or active ingredients, the compositions and the methods of this invention are clearly illustrated by the following tests.

TEST I.—FOLIAR SPRAY TESTS (1) Downy mildew of cucumber.—Cucumber seeds were sown in seed bed. When they were 8 to 10 leaves stage, they were transplanted into soil in cultivated field. After 24 hours transplanting, they were sprayed with the test solution (500 to 300 p.p.m. active ingredeint). Five plants used for each treatment. Disease infection was made by natural infection. When the untreated plants were heavily infested by the downy mildew, *Pseudoperonospora cubens,* disease symptoms were observed, suprior control was obtained on the treated plants.

(2) Powdery mildew of cucumber.—Cucumber plants of 20 days old were sprayed with each compound twice at the interval of one week. At the beginning of test, severely diseased plants (cucumber infected with powdery mildew, *Sphaerotheca fuliginea*) were randomly placed among the treated plants to attempt natural infection. Disease index of cucumber leaves was estimated on 3 plants on 14th day after the 1st spray. Control value was calculated by the following equation.

Control value (percent)
$$= \left(1 - \frac{\text{sum of disease index on the treated}}{\text{sum of disease index on the untreated}}\right) \times 100$$

The result was shown in Table II.

TABLE II.—ANTI-POWDERY MILDEW ACTIVITY

| Compound | Active conc. (p.p.m.) | Control value (percent) | Phytotoxicity [1] |
|---|---|---|---|
| I | 1,000 | 100 | + |
|  | 500 | 100 | − |
|  | 300 | 95 | − |
|  | 100 | 93 | − |
|  | 50 | 62 | − |
| II | 1,000 | 100 | + |
|  | 500 | 100 | − |
|  | 300 | 88 | − |
|  | 100 | 85 | − |
|  | 50 | 80 | − |
| III | 1,000 | 100 | + |
|  | 500 | 96 | − |
|  | 100 | 84 | − |
|  | 50 | 61 | − |
| IV | 1,000 | 100 | + |
|  | 500 | 100 | − |
|  | 100 | 91 | − |
|  | 50 | 85 | − |
| V | 1,000 | 100 | + |
|  | 500 | 94 | − |
|  | 100 | 90 | − |
|  | 50 | 80 | − |
| VI | 1,000 | 100 | + |
|  | 500 | 100 | − |
|  | 100 | 100 | − |
|  | 50 | 81 | − |
| 2-(1-methyl-n-heptyl)-4,6-dinitrophenyl crotonate.[2] | 1,000 | 100 | ++ |
|  | 500 | 96 | − |
|  | 200 | 75 | − |
|  | 100 | 60 | − |
|  | 50 | 53 | − |
| Untreated | | 0.0 | − |

[1] Observation of phytotoxicity: − no injury; + slight injury; ++ severe injury.
[2] The compound is a well known foliage fungicide for control of powdery mildew diseases as Karathane.

(3) Powdery mildew of strawberry.—Strawberry plants transplanted in the soil in greenhouse. When the plants were infested by the powdery mildew *Sphaerotheca humuli,* they were sprayed with the test suspensions (300 and 200 p.p.m. active ingredient) twice at the interval of five days. After two weeks of the later spraying, the plants were investigated. The result is shown in Table III.

TABLE III.—ANTI-POWDERY MILDEW ACTIVITY

| Compound | Active ingredient, p.p.m. | Number of Investigated fruits | Number of Infested fruits | Percent of powdery mildew infested fruits |
|---|---|---|---|---|
| I | 300 | 68 | 0 | 0 |
|  | 200 | 74 | 4 | 5 |
| II | 300 | 70 | 0 | 0 |
|  | 200 | 62 | 1 | 0 |
| IV | 300 | 73 | 0 | 0 |
|  | 200 | 69 | 3 | 4 |
| VI | 300 | 65 | 0 | 0 |
|  | 200 | 68 | 2 | 3 |
| 2-(1-methyl-n-heptyl)-4,6-dinitrophenyl crotonate. | 200 | 63 | 0 | 0 |
|  | 100 | 67 | 14 | 21 |
| Untreatment | | 61 | 57 | 93 |

TEST II.—SOIL DRENCH TEST

Powdery mildew of cucumber.—Cucumber plants of 25 days old were grown in the waggoner pots (1/5000 a) filled with sandy loam including normal humidity. Each plant in the pot was treated with 200 ml. of the test solution (30 and 10 p.p.m. active ingredient). The inoculation was made by dusting with the conidia of *Sphaerotheca fuliginea* gathered from heavily infected cucumber. After 3 weeks of treatment, control value was calculated by the equation of Test I(2).

TABLE IV.—CONTROL OF POWDERY MILDEW BY SOIL DRENCH METHOD

| Compound No. | Control value (percent) | |
|---|---|---|
| | 30 p.p.m. | 10 p.p.m. |
| I | 100 | 90 |
| II | 100 | 96 |
| III | 99 | 85 |
| IV | 100 | 91 |
| V | 95 | 82 |
| VI | 100 | 96 |
| Untreated | 0 | 0 |

What we claim is:
1. A compound of the formula

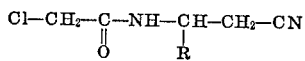

wherein R is a hydrogen atom or an alkyl radical having 1 to 3 carbon atoms.

2. A compound of the formula

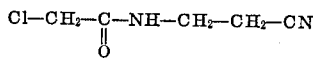

3. A compound of the formula

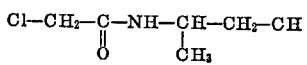

References Cited

UNITED STATES PATENTS 3,102,068   8/1963   Tolbert _____ 260—465.4 X

OTHER REFERENCES

Weaver et al., Journal American Chemical Society, vol. 69, pp. 515–516, 1947.

Freudenberg et al., Berichte der Deutschen Chemischen Gesellschaft, vol. 65, p. 1187, 1932.

Hopp-Seyer's Zeitschrift für Physiologische Chemie, vol. 154, pp. 163–164, 1926.

Leonard et al., Journal of Bacteriology, vol. 57, pp. 339–347, 1949.

Clark et al., Biochemical Journal, vol. 55, pp. 839, 846, 850, 851, 1953.

CHARLES B. PARKER, *Primary Examiner.*

S. T. LAWRENCE III, *Assistant Examiner.*

U.S. Cl. X.R.

424—304